United States Patent [19]

Bioret et al.

[11] Patent Number: 4,581,199
[45] Date of Patent: Apr. 8, 1986

[54] EARTHQUAKE RESISTANT HALL FOR A NUCLEAR BOILER AND ITS CONFINEMENT CHAMBER

[75] Inventors: Bernard Bioret, Nantes; Serge Holub, Orvault; Joseph Michaut, Coueron; Robert Pierart, Nantes, all of France

[73] Assignee: Alsthom-Atlantique, France

[21] Appl. No.: 440,375

[22] Filed: Nov. 9, 1982

[30] Foreign Application Priority Data

Nov. 9, 1981 [FR] France ............... 81 20910
Sep. 10, 1982 [FR] France ............... 82 15339

[51] Int. Cl.⁴ .................. G21C 9/00; G21C 13/00
[52] U.S. Cl. .................. 376/285; 376/293; 376/461; 52/167; 254/93 R
[58] Field of Search .................. 376/461, 285, 293; 52/167, 224, 169.6, 169.7; 254/93 R; 188/311, 298, 297

[56] References Cited

U.S. PATENT DOCUMENTS

| | | |
|---|---|---|
| 3,152,713 | 10/1964 | Clifford . |
| 3,716,451 | 2/1973 | Van Sickel et al. ............... 376/461 |
| 3,771,499 | 11/1973 | Marroni et al. ............... 376/461 X |
| 3,795,139 | 3/1974 | Peck . |
| 3,930,942 | 1/1976 | Thorne ............... 376/461 X |
| 4,064,005 | 12/1977 | Baujat ............... 376/461 |
| 4,076,214 | 2/1978 | Colly ............... 254/93 R |
| 4,088,897 | 5/1978 | Soot ............... 376/285 X |
| 4,121,393 | 10/1978 | Renault et al. ............... 52/167 |
| 4,236,970 | 12/1980 | Haraud et al. ............... 376/285 X |
| 4,266,379 | 5/1981 | Valencia Aguilar ............... 52/167 X |

FOREIGN PATENT DOCUMENTS

| | | |
|---|---|---|
| 0079048 | 5/1983 | European Pat. Off. ............... 52/167 |
| 1916161 | 10/1969 | Fed. Rep. of Germany . |
| 2502769 | 7/1976 | Fed. Rep. of Germany ............... 52/167 |
| 2808565 | 8/1979 | Fed. Rep. of Germany ............... 376/285 |
| 2940469 | 4/1980 | Fed. Rep. of Germany ............... 376/285 |
| 1172996 | 2/1959 | France . |
| 2221953 | 10/1974 | France . |
| 2316412 | 1/1977 | France . |
| 2434461 | 3/1980 | France . |
| 0006475 | 2/1972 | Japan ............... 376/285 |
| 889758 | 2/1962 | United Kingdom . |

OTHER PUBLICATIONS

"Protection of Nuclear Power Plants Against Seism", Plichon et al., Nuc. Tech, Jul. 1980, pp. 295–306.
"Engineering Design for Earthquake Environments", I Mech. E Conf. Pub. 1978-12, pp. 1–58, 91–100, 119–127, 193–205.
"Implications of Wash-1400-The Reactor Safety Study", Birkhofer et al., ANS., Nov. 1976, pp. 331–332.
Combustion, vol. 44, No. 12, Jun. 1973, New York.
Schweissen und Schneiden, vol. 20, No. 9, 1968, Dusseldorf.

Primary Examiner—Richard E. Schafer
Assistant Examiner—Daniel Wasil
Attorney, Agent, or Firm—Sughrue, Mion, Zinn, Macpeak, and Seas

[57] ABSTRACT

Hydraulic jacks are arranged radially both inside and outside the confinement chamber (EC), substantially on a level with the center of gravity of the boiler (BV, EA) disposed inside. The inside jacks transmit thrust to the boiler via an annular floor (20). The outside jacks transmit thrust to the walls (M) of the hall. The outside jacks are arranged as energy-absorbing dampers. The inside and outside jacks resist fast compression by means of calibrated fluid flow orifices, while they expand readily by means of one way valves and pressure accumulators. The boiler and the confinement chamber stand on a base that is resiliently movable in a horizontal direction relative to the raft (R) of the building. This ensures that the reactor is returned to its normal position once an earthquake is over.

10 Claims, 13 Drawing Figures

EARTHQUAKE RESISTANT HALL FOR A NUCLEAR BOILER AND ITS CONFINEMENT CHAMBER

There exist "compact" or light water PWR type nuclear boilers which operate at low or medium power (e.g. between 200 and 2000 thermal MW). These boilers comprise a reactor vessel associated with steam generators via linking tubes for the primary heat exchange fluid, which tubes are as short as possible. The resulting assembly must be held in a very rigid support structure such as the structure described in French patent application No. 78 20405 dated June 23, 1978 (corresponding to U.S. Ser. No. 48,802). Said structure serves to hold such a nuclear boiler in a predetermined fixed position without play, and without creating any points of abnormal stress. These conditions must continue to apply regardless of the relative expansion and deformation between the devices making up the boiler and/or the support structure itself.

The assembly comprising the reactor vessel, the steam generators, their biological shields, and the support structure may be referred to as a "steam production block".

There also exist other nuclear boilers of comparable power, and also using light water, which are known as "integrated" boilers because the steam generators are disposed inside the reactor vessel. The reactor vessel together with its supporting structure then constitutes the steam production block.

In compact or integrated nuclear boilers, the steam production block is in the form of a column of high mass and of small base area compared with its height. (The height may be four or more times the base diameter). The column is disposed inside a metal confinement chamber which is spherical or cylindrico-spherical in shape and which, in addition to the pressuriser, contains various items of auxiliary equipment which are relatively light in weight, but bulky. The entire assembly constitutes the "boiler".

The volume of the chamber must therefore be large just to contain the equipment it houses. Another reason for having a chamber of large volume is to limit the overpressure which would be generated in the result of an accidental loss of primary circuit cooling fluid. The volume of the chamber is thus not directly dependant on the dimensions of the steam production block it houses.

BACKGROUND OF THE INVENTION

The boiler and the surrounding chamber are conventionally installed in a hall which is at least partially made of concrete and whose main function is to provide protection against external shocks such as falling aircraft. The hall is a part of a building which stands on a raft and which includes other halls for housing various items of equipment. The term "nuclear hall" is used herein to designate the assembly comprising the boiler, its confinement chamber, and the hall which contains them.

It is desireable to hold the boiler and its confinement chamber in such a manner relative to the concrete structure of the hall that the integrity of the boiler is not at risk from horizontal movement which an earthquake could apply thereto. If possible, the boiler should also continue to operate. This means that each component of the boiler must not be subjected to greater accelerations and movements than those for which it was designed. An acceptable level of acceleration could be obtained by limiting the horizontal forces which can be transmited by the structure to the boiler and the confinement chamber, in other words by allowing the assembly to move horizontally in a substantially unhindered manner in the event of an earthquake. Unfortunately such freedom of movement would mean that the boiler would occupy a random position at the end of the earthquake, with the likelihood of its being too far removed from its initial position for continued operation of the nuclear station to be possible.

Since such freedom of movement cannot be tolerated, it seems necessary to provide the nuclear hall with retaining means for limiting the movement of the boiler relative to the concrete structure during an earthquake to a fraction of what it would otherwise be. Unfortunately, the presence of conventional retaining means has the effect of applying accelerations to the boiler which are not just equal to those applied to the concrete structure, but which are much higher. It turns out that during an earthquake, the random movements of the ground (especially the oscillating movements) together with the corresponding accelerations are modified and generally amplified by buildings and other ground supported structures. This is because said buildings and structures are not perfectly rigid, but are capable of elastic deformation.

This effect is particularly true of a nuclear hall: its concrete structure provides a first stage of amplification of accelerations, which when transmitted to the nuclear boiler are further amplified by the metal structure of the boiler, in such a manner that boiler components are subjected to accelerations derived from those of the ground, but after passing through two successive stages of amplification. The first stage may amplify by more than four times for some kinds of concrete structure and for frequencies in the range 2 to 20 Hz. Likewise, the second stage may amplify by more than four times for some metal structures and for frequencies in the range 2 to 20 Hz.

The problem of providing retaining means is further complicated by the various thermal expansions to which the chamber and other components are subject during normal operation of the boiler. Further, in the event of an accidental leak of cooling fluid, the chamber will expand due to the increase in internal pressure and temperature, and it is under these conditions that it must stand up to the highest forces. The problem is thus to dispose the boiler and the confinement chamber inside the concrete structure in such a manner as to ensure both the integrity or non-disruption of the boiler in the event of an earthquake and the integrity of the chamber in the event of a leak of primary cooling fluid. Finally it should be observed that the forces and the energy likely to be applied to the boiler during an earthquake are very high, with forces of around 9000 tons and an energy of about $10^9$ J for a boiler weighing 4,500 tons being subjected to 100 oscillations of 10 cm amplitude at a frequency in the range 3 to 15 Hz.

One solution which the present inventors have already proposed to this problem consists in making the base of the steam production block in such a manner that it can be anchored to the raft of the concrete structure sufficiently rigidly to minimise relative movement therebetween. The confinement chamber is then connected to the raft in a manner that does not hinder its dilation.

The raft of the concrete structure must then be thick enough to stand up to the forces to which it is subjected during an earthquake. When the station is not a low power station, the raft must be very thick since the mass of the steam production block is measured in thousands of tons and its height in tens of meters. The bending moment applied to the raft is proportional to the mass of the block multiplied by the height of its center of gravity, and the anchoring forces on the raft are proportional to the moment and inversely proportional to the transverse dimensions of the base. The cost of the raft starts to become an excessive fraction of the total installed cost of the nuclear boiler.

Further, again because of the mass and the height of the boiler, the mass and the cost of the supporting structure for the boiler are both high, since the structure must be sufficiently rigid from its base to avoid excessive bending in the event of an earthquake, where the bending moment applied to the base of the structure is naturally the same as the moment applied to the raft.

Preferred embodiments of the present invention provide a nuclear hall capable of preventing excessive acceleration being applied to a nuclear boiler in the event of an earthquake, without excessively increasing the cost of the concrete raft on which the hall is built nor the cost of the metal structure placed on the raft to support the boiler. Further, such preferred embodiments do not hinder dilation of the confinement chamber surrounding the boiler, nor do they hinder dilation of the boiler itself.

SUMMARY OF THE INVENTION

The present invention provides a nuclear hall having a boiler and a confinement chamber capable of withstanding earthquakes, the hall comprising:

- a concrete structure comprising a substantially horizontal ground-supported concrete raft, and having side walls standing substantially vertically on said raft;
- a thin walled metal confinement chamber having a vertical axis, said chamber being placed in between said side walls and resting on said raft via a base having a surface area that is at least 25% less than the maximum horizontal section area of said chamber;
- a nuclear boiler comprising a steam production block and auxiliary equipment, said boiler being housed inside said confinement chamber, resting on said base, and having a center of gravity which is at a greater distance above the raft than the diameter of the base;
- and means for limiting oscillations of the chamber and the boiler relative to the concrete structure, while still permitting relative thermal expansions and contractions therebetween;
- wherein the means for limiting oscillations comprise:
- an annular metal floor inside the confinement chamber surrounding the steam production block and fixed thereto at a predetermined height above the base, the floor being reinforced by internal radially-extending stiffeners which are evenly distributed around the axis of the confinement chamber;
- at least one internal hydraulic jack acting radially between the outer end of each of said internal stiffeners and the inside surface of the confinement chamber, there being an internal thrust block located between said jacks and the thin wall of the chamber;
- at least one external hydraulic jack acting radially in opposition to each of said internal jack-equipped stiffeners and being located between said side walls of the hall and the outside surface of the confinement chamber, there being an external thrust block located between said external jacks and the thin wall of the chamber, with each external thrust block being disposed opposite to a corresponding one of the internal thrust blocks;
- pressure accumulators for applying a permanent fluid pressure to each of said jacks, tending to cause them to press against the wall of said chamber; and
- non-return valve means disposed between each jack and an accumulator connected thereto to limit the flow of working fluid in the direction from the jack to the accumulator, thereby limiting the speed at which each jack can move away from the wall of the chamber when a compression force is applied thereto during some phase of an earthquake, while allowing the jack to return freely, i.e. substantially without resistance or dissipation, during opposing phases of an earthquake "fast" enough to remain permanently pressed against the chamber wall, regardless of the motion of the chamber and the boiler, or the deformation of the floor;
- the non-return valve means of each internal jack limiting the compression movement of the jack to a "slow" speed which is slow enough to avoid substantial energy dissipation in said internal jacks or any large displacement of the boiler relative to the chamber during an earthquake, said "slow" speed being nevertheless greater than the speed of relative motion caused by differential expansions and contractions of the chamber and the boiler, whereby such non-earthquake relative displacements take place substantially unhindered by the jacks.

The non-return valve means of the external jacks may be identical to those of the internal jacks. However, when the concrete structure is not sufficiently rigid, or when large earthquakes are to be expected, it is preferable for the non-return valve means of each external jack to limit the compression movement speed of each external jack to an "intermediate" speed lying between said "slow" and said "fast" speeds. The "intermediate" speed limit is achieved by applying a degree of resistance suitable for transforming a significant portion of the mechanical energy applied to the external jack during an earthquake into heat, thereby damping the oscillations of the boiler. Each external jack then comprises heat dissipating means suitable for absorbing said heat generated in the jack during an earthquake without exceeding a predetermined maximum temperature. Further, the base of the boiler and the chamber stand on the raft via skates for enabling the base to move horizontally relative to the raft in a reversible manner, so that resilient return means can act on said base to return the boiler and the chamber to their initial position after an earthquake and without exerting large forces on the chamber.

By way of example, said "slow" speed may be about $10^{-4}$ m/s, with the "intermediate" speed being about 1 m/s, and said "fast" speed being more than 2 m/s.

Such an intermediate speed represents a reasonable compromise between keeping relative displacements between the boiler and the concrete structure as small as possible, while also keeping the absolute accelerations to which the boiler is subjected as small as possible.

More generally, taking into account the wide range of conditions over which the invention could be applied, it seems that the "slow" speed should be less than $2 \times 10^{-4}$ m/s, while the "intermediate" speed should be at least 100 times the slow speed but not more than 1.5 m/s.

It may be observed that proposals have already been made for providing lateral support to the confinement chamber of a nuclear reactor intended for use on board a ship. For example, forces are transmitted to outside horizontal tie beams via four link members that are fixed both to the inside structures of the chamber and to the chamber itself. The tie beams form a square framing the chamber and they are anchored at their ends.

Such arrangements are useful on board ships such as the Otto Hahn (Kernergie-Forschungsshiff N. S. Otto Hahn), which are not expected to suffer numerous shocks. However, they have the disadvantage of concentrating forces on the chamber in the vicinity of the link members, and, by virtue of the resilience of the tie beams, they do not prevent movement, even if limited, and that can lead to damaging accelerations being applied to the chamber.

The present invention is intended for use with land-based reactors which are likely to suffer earthquakes, which tend to be in the form of a succession of many back and forth movements, and such ship-based devices are thus not applicable because of the concentrated forces they apply to the thin-walled confinement chamber, and because of the size of the movements which result from the resilience of the external horizontal tie beams.

BRIEF DESCRIPTION OF THE DRAWINGS

Two embodiments of the invention are described by way of example with reference to the accompanying drawings. Members shown in several of the drawings, have the same references in all of them.

FIG. 11 is an elevation and FIG. 12 is a horizontal section along a line XII—XII.

MORE DETAILED DESCRIPTION

Figure 1:
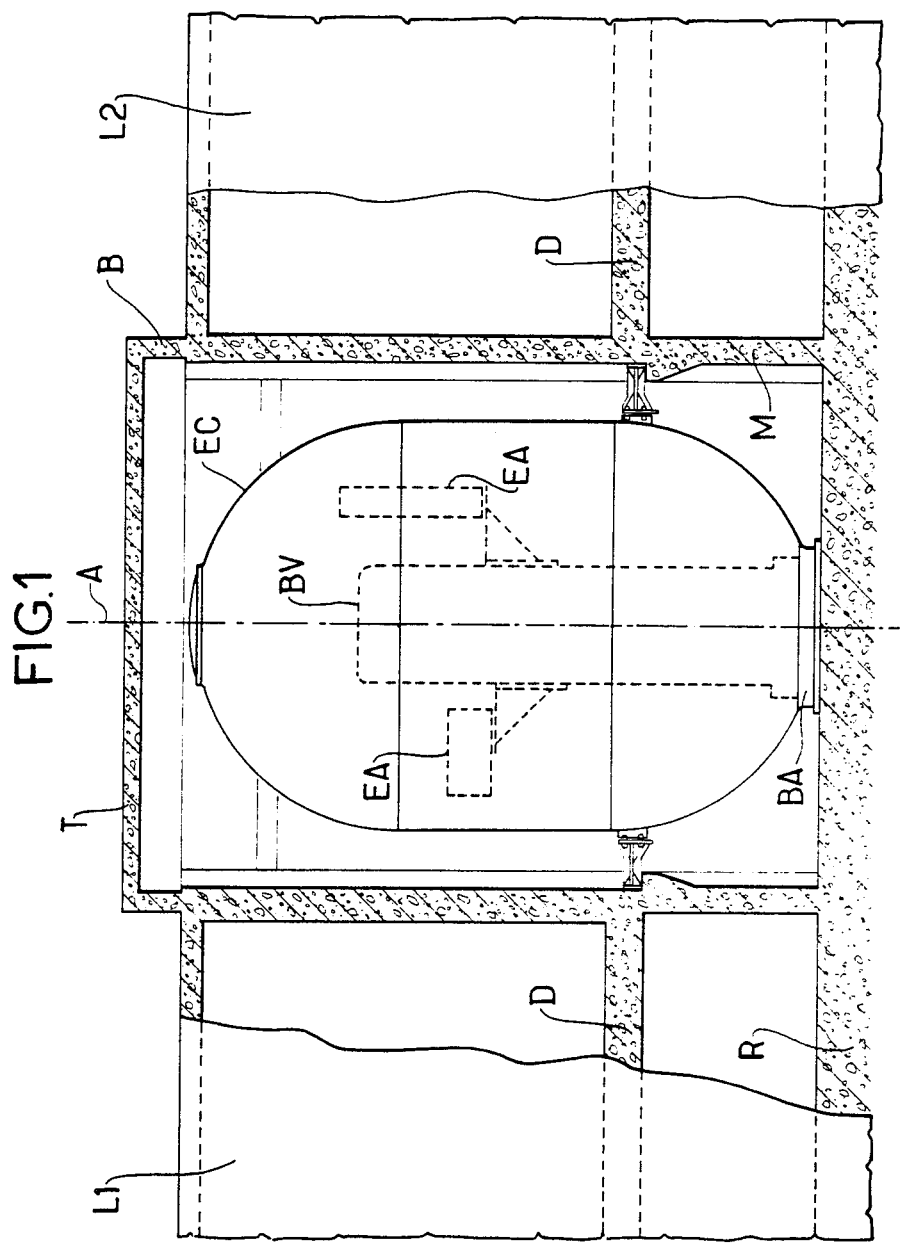
FIG. 1 is an overall partial elevation of a first hall embodying the invention.
Figure 2:
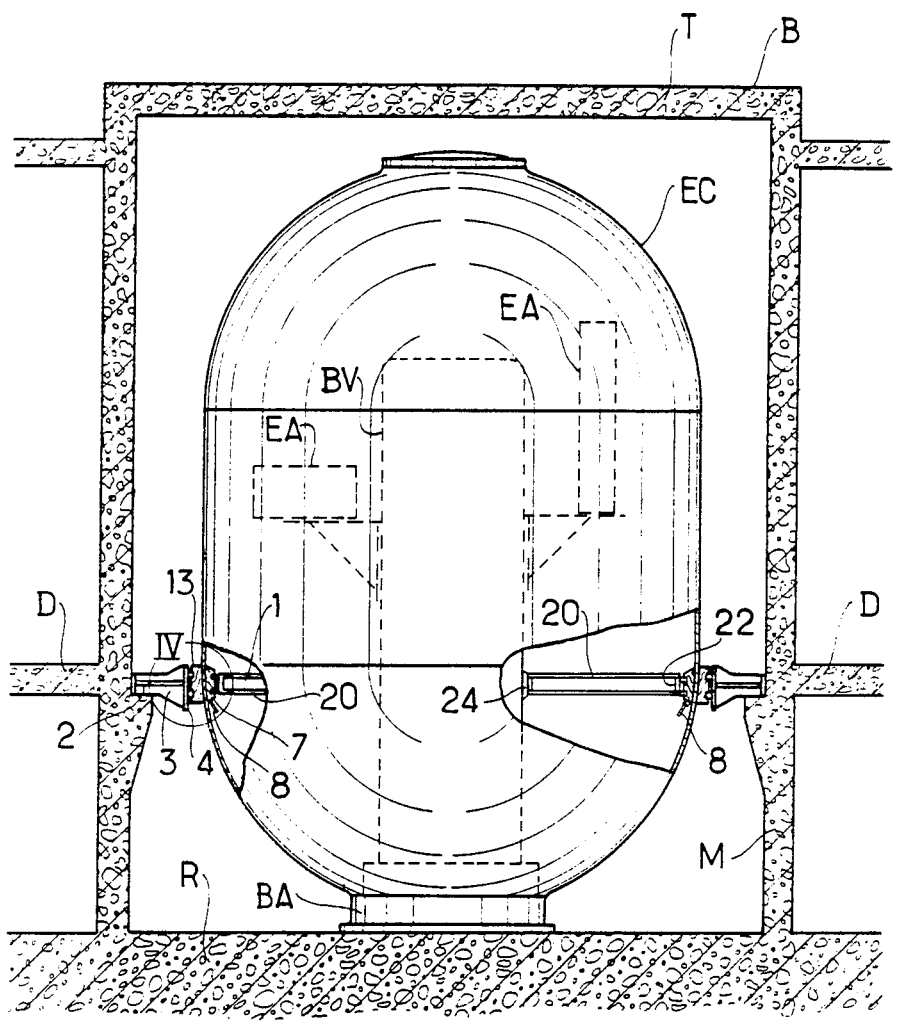
FIG. 2 is a partially cut away view of a portion of FIG. 1 on a larger scale.
Figure 3:
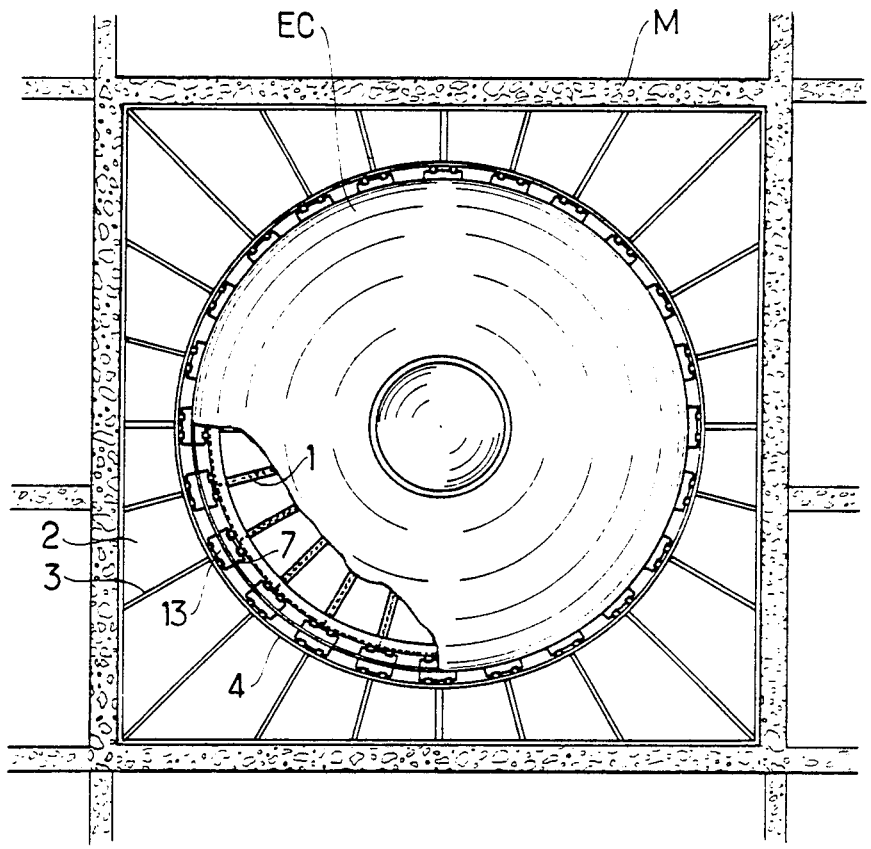
FIG. 3 is a plan view of the same hall.
Figure 4:
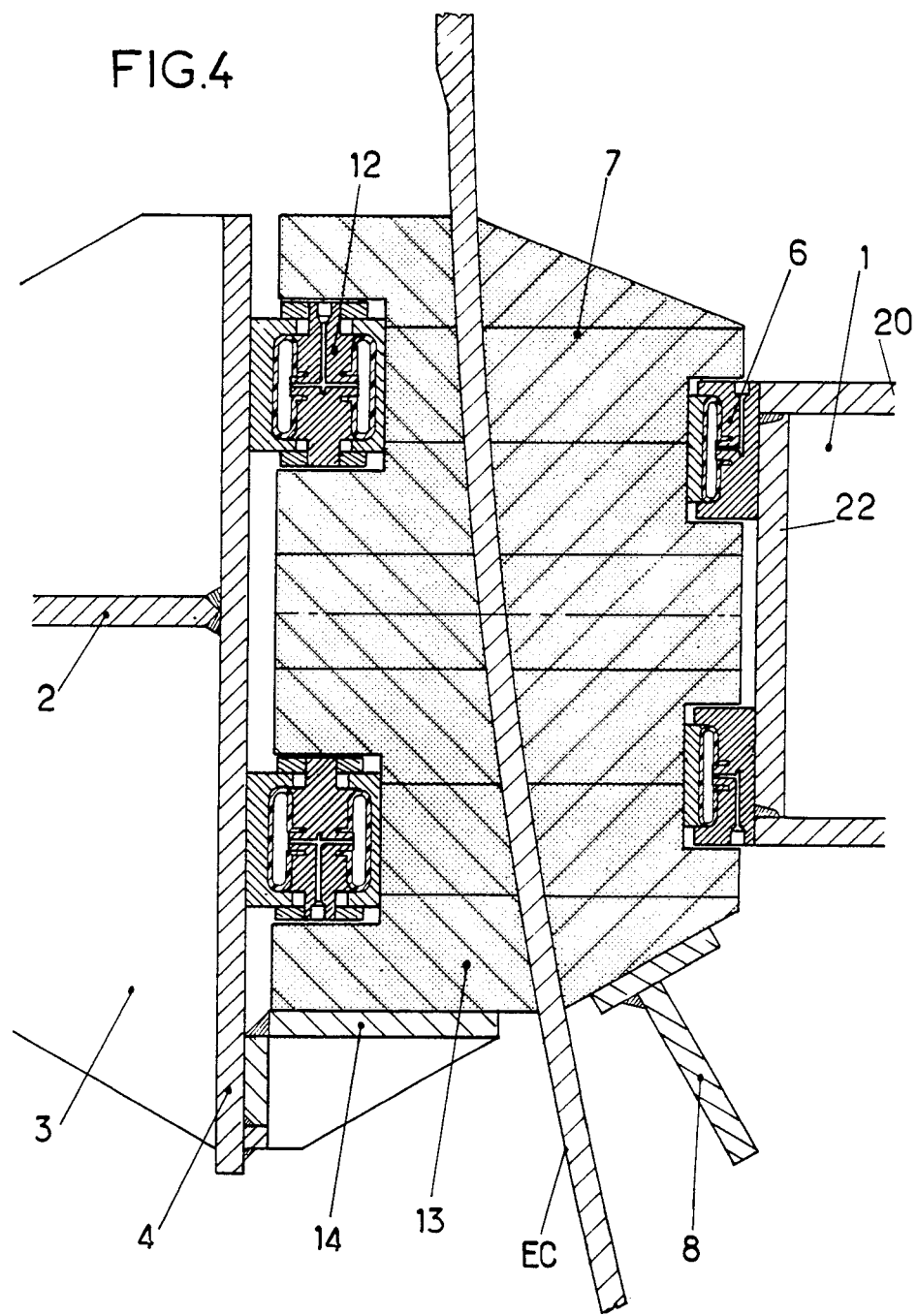
FIG. 4 is a vertical section through two thrust blocks used on either side of the confinement chamber.

Each of the nuclear halls described below by way of example is integrated in a concrete building B whose roof T provides a shield against accidental impacts from the outside, e.g. a falling aircraft. The building is built on a raft R constituted of re-inforced concrete in the same manner as the rest of the building, and may be 2 m (meters) thick. The building includes a plurality of halls L1, L2, and in particular it includes vertical walls M delimiting the main or nuclear hall which has a square floor plan. The halls surrounding the nuclear hall are provided with horizontal slabs D constituting their floors and also strengthening the walls M against horizontal forces.

A nuclear boiler is placed in the middle of the nuclear hall. It has a steam production block BV in the form of a vertical cylindrical metal column standing on a base BA on the raft. Auxiliary equipment EA is fixed to said column. The base may have a diameter of 8.5 m for example, while the assembly of the block BV and the equipment EA weighs 4200 T (tons) and its center of gravity is 12.5 m above the raft R, about on a level with the slabs D.

The block BV and the light-weight equipment EA are disposed inside a coaxial steel confinement chamber EC which is sealed to the base EA and which is supported thereon. The chamber is cylindrico-spherical in shape comprising two hemispheres interconnected by a cylindrical tube of the same diameter, e.g. 20 m. The spherical portions are made from 3 cm thick steel sheet while the cylindrical portions are made from 6 cm thick steel sheet. The chamber is said to be thin-walled in that it is not designed to withstand bending forces other than the relatively small bending forces produced by its own weight. In contrast, it must withstand excess internal gas pressure, and it must be able to expand freely.

Although it may be useful to anchor the base BA to the raft R in the first nuclear hall described herein, the invention does not provide for such anchoring to retain the chamber EC and the steam production block BV in the event of an earthquake.

The retaining means provided in accordance with the invention include a two-layer metal floor 20 inside the confinement chamber EC and constituting an annular horizontal beam with regularly spaced internal radial stiffeners 1 fixed to the assembly of structures installed inside the confinement chamber. The floor is disposed substantially on the same level as the center of gravity of the steam generator block BV. The outer end of each stiffener is fitted with four hydraulic jacks 6 that apply thrust between said end and a thrust block 7 made of wood or of any other suitable material which is not as hard as steel. The thrust block bears against the inside surface of the confinement chamber, and is supported on a metal support 8. The number of wooden blocks is a multiple of four, e.g. 24 in the case of the first nuclear hall described The internal floor 20 has a cylindrical outer wall 22 providing a circular bearing surface, and a cylindrical inner wall 24 surrounding the steam generator block BV.

The jacks 6 are connected to hydraulic accumulators 9 by a non-return valve systems comprising ducts 15, two constriction diaphragms 10 and one ball 11 per jack. The operation of the system is described further on. An external floor is provided around the outside of the confinement chamber. In the first nuclear hall described herein this external floor is made of metal, and until specified otherwise, the following portion of the description applies to the first hall only. The external floor comprises a horizontal sheet 2 surrounding the chamber EC, and fitted with radial stiffeners 3 which are aligned with the stiffeners 1.

The ends of the stiffeners and the rim of the sheet 2 nearest to the chamber are fixed to a cylindrical metal wall 4 disposed co-axially about the chamber.

An annular space is left between said wall and the chamber, and four hydraulic jacks 12 are inserted in this space between the end of each stiffener and the chamber. The jacks may be single or double jacks depending on the size of the expected dispalcements, and each has one end bearing against the wall 4 and the other against a thrust block 13. The thrust blocks 13 are similar to the thrust blocks 7 and they are applied against portions of the surface of the chamber which are exactly opposite the portions against which corresponding blocks 7 are applied. Each thrust block 13 is supported by metal bracket 14.

The outer rim of the stiffened floor 2 is square, and bears against the concrete wall M of the building B where they surround the chamber EC. Metal plates are interposed between the floor 2 and the walls M to transmit thrust.

The jacks 12 are connected to hydraulic accumulators 9 by a non-return valve system including pipework with two constriction diaphragms 10 and one ball 11 per jack 12.

Permanent contact between the wooden blocks 7 and 13 and the wall of the confinement chamber EC sandwiched in between them is ensured by maintaining low pressure permanently in the jacks.

Pressure variations inside the chamber and differential thermal expansion and contraction of the stiffeners, the floors and the walls of the chamber EC all give rise to relative movement between said components. However, such movement is slow so the loss of head caused by the hydraulic fluid passing through the constriction diaphragms is too small to hinder the movement.

In contrast, when fast acting horizontal forces are applied, the hydraulic fluid in the jacks is suddenly compressed and urged towards the accumulators 9. The balls 11 are thrust hard against their seats, thereby forcing the fluid to pass through the contrictions in the diaphragms 10. The head loss caused by the fluid trying to pass quickly through the constrictions is then substantially equivalent to the jacks being locked, and the pressure in the jacks rises steeply.

By way of example, each jack may have a working surface area of 275 cm$^2$, and be fed with hydraulic fluid, e.g. water, at a permanent pressure of a few bars. The constrictions may limit the jacks to a compression speed of 5 mm per minute, which speed is substantially independant of the pressure difference driving the fluid through the constrictions.

It is important to ensure that a burst in one of the pipes supplying hydraulic fluid to the jacks should not cause a "common mode" fault, i.e. should not cause loss of pressure in the entire set of jacks.

Figure 5:
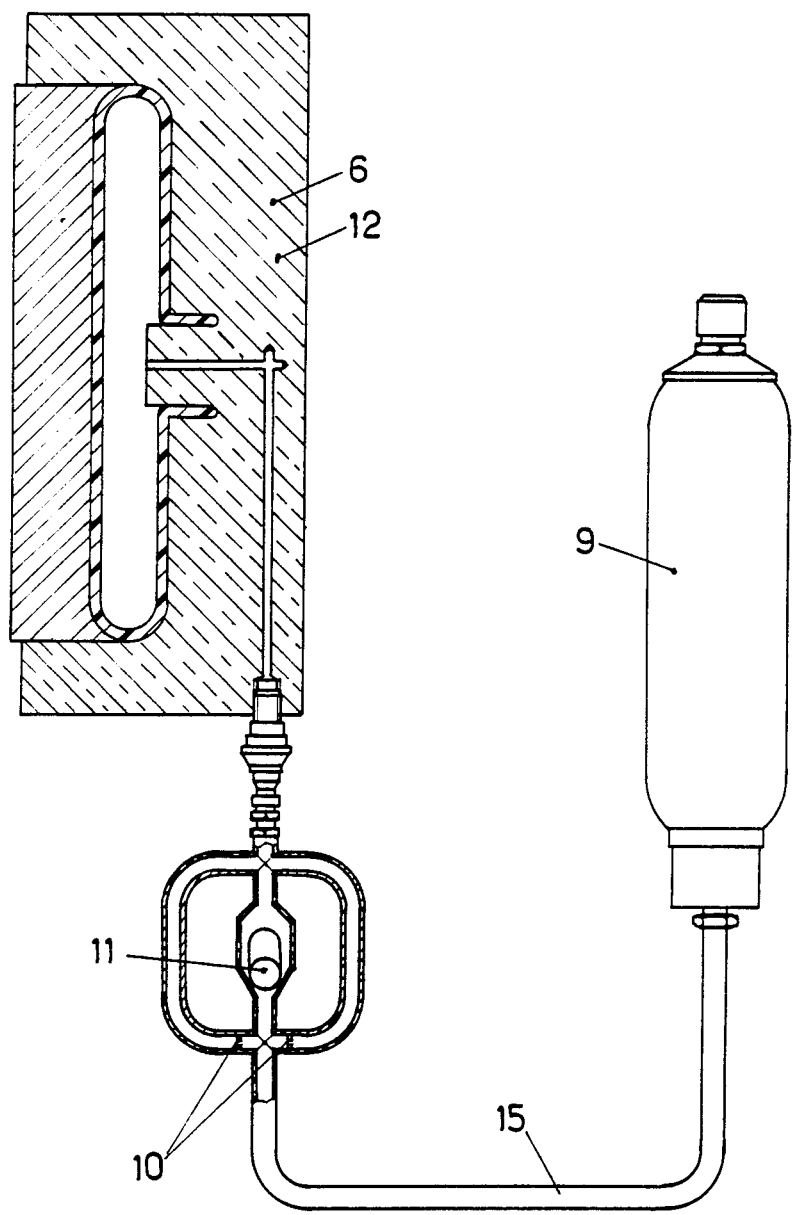
FIG. 5 is a very diagrammatic view of the system for feeding a hydraulic jack in the hall.
Figure 6:
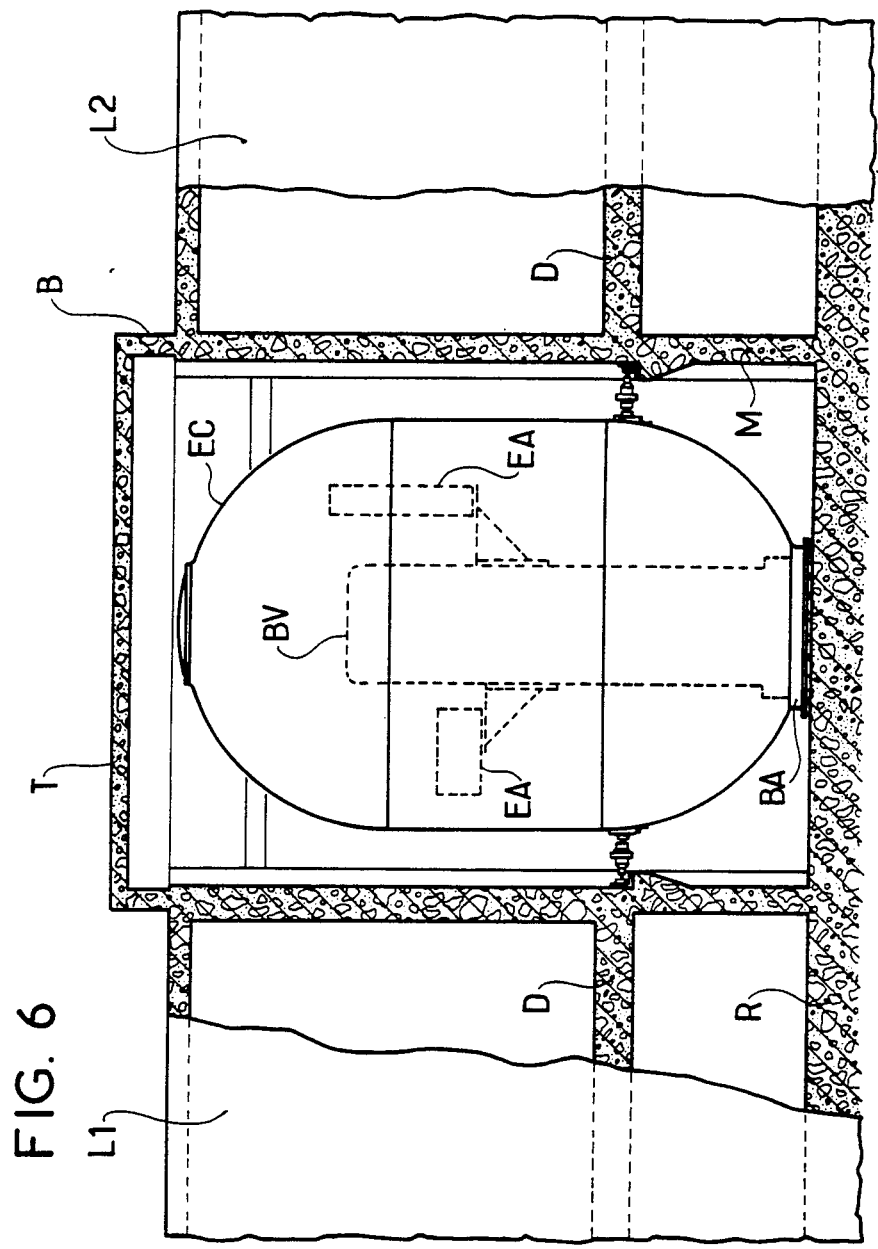
FIG. 6 is an overall elevation similar to FIG. 1 showing a second hall embodying the invention.
Figure 7:
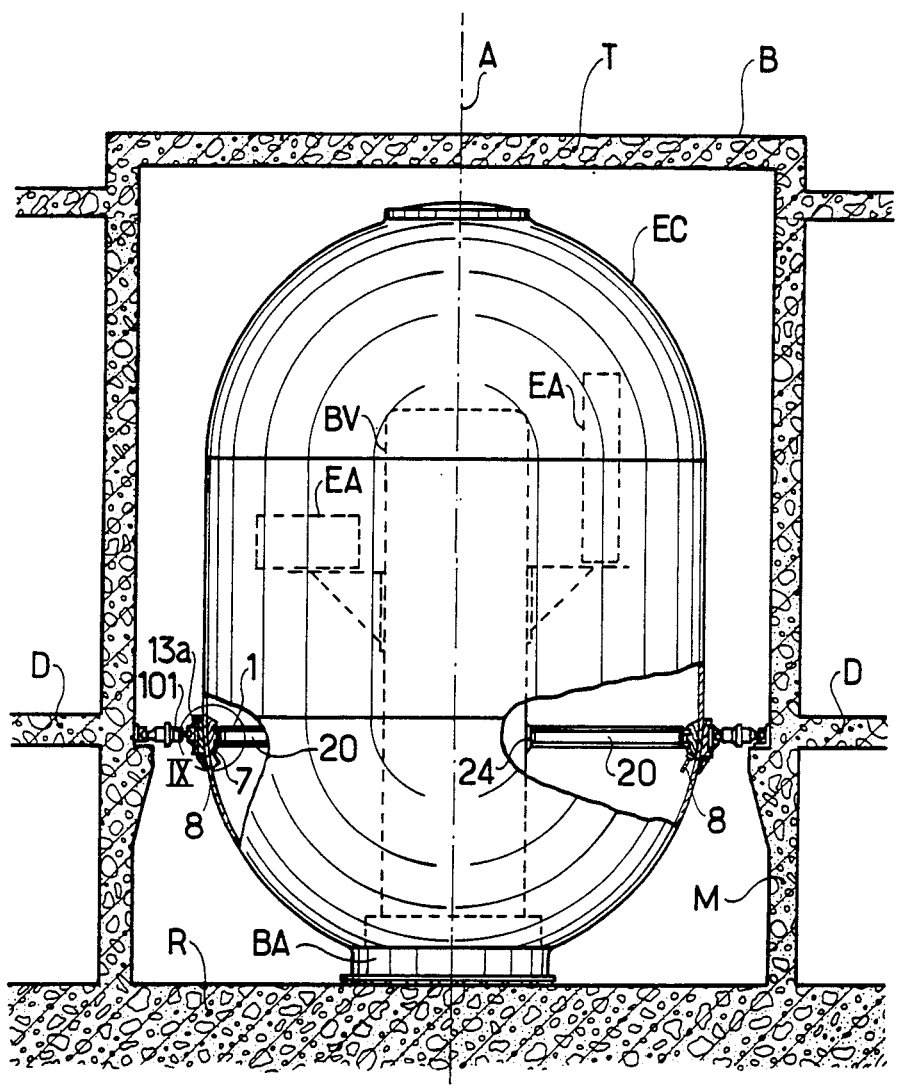
FIG. 7 is a partially cut away view of a portion of FIG. 6 on a larger scale.
Figure 10:
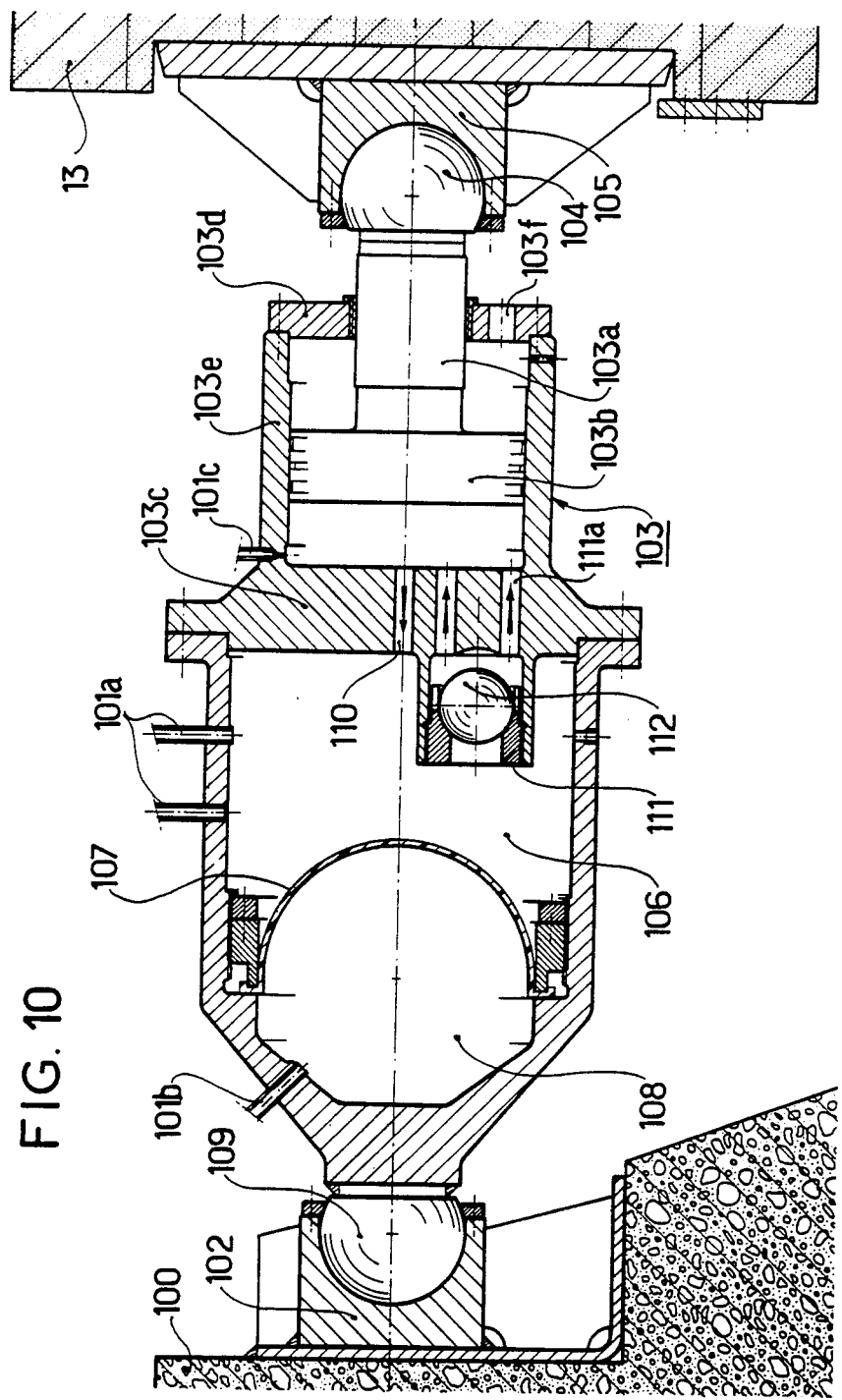
FIG. 10 is a vertical section through an external hydraulic damper used in the second hall, which has internal jacks identical to those used in the first hall.

If a burst occurs between a jack and its associated non-return valve, only the jack directly concerned is put out of action immediately. However, all the jacks connected to the same hydraulic accumulator will eventually be put out of action, say after a few minutes have elapsed. Thus the valve outlined in FIG. 5, for example, is not practical and is only drawn the way it is to make the principle of operation clear. In practice the non-return valve is integral with the jack to avoid the possibility of a burst between a jack and its valve. Such an arrangement is described further on in greater detail for a hydraulic damper, as shown in FIG. 10.

If a burst occurs between a non-return valve and an accumulator, the jacks connected to the same accumulator will continue to work for as long as they are jamming their balls against their seats. However, once the pressure has had a chance to drop, they will cease to function properly since the accumulator will be unable to return hydraulic fluid to them. It is thus important to ensure that such a burst will only affect a small number of jacks. A large number of accumulators are thus provided. It is preferable for each accumulator to feed jacks or groups of jacks that are regularly spaced around the chamber. In any event only small groups of adjacent jacks should be connected to the same accumulator, thereby ensuring that a single burst pipe 15 cannot knock out too wide a sector of adjacent jacks In the example described, there is one accumulator per four groups of four jacks each, with the four groups that are connected to the same accumulator being spread around the boiler at 90° intervals. The mechanical strength of the various components is chosen in such a manner that the system as a whole can stand up to a design earthquake even in the presence of burst pipework to any one accumulator. Further, the pressure in each accumulator is permanently indicated in a control room and alarms are provided in the event of a pressure drop. The accumulators connected to the external jacks are different from the accumulators connected to the internal jacks, in particular since the internal jacks are connected to accumulators which are located inside the confinement chamber.

Although the first nuclear hall described above stands up well to earthquakes, it relies on the concrete structure being highly rigid, so in most cases it appears to be preferable to avoid the cost of making the building that rigid while still providing protection against large earthquakes, by using a somewhat different arrangement as described with reference to a second nuclear hall which is described below by way of example. The second hall is identical in most respects to the first which has already been described, however it differs in the following respects, some of which are of minor importance:

There are 32 stiffeners and thrust blocks associated with the internal and external floors.

The external floor is made of reinforced concrete and referenced 100. It does not have visible stiffeners, but the reinforcing rods embedded in the concrete are arranged to withstand the applied forces.

Figure 8:
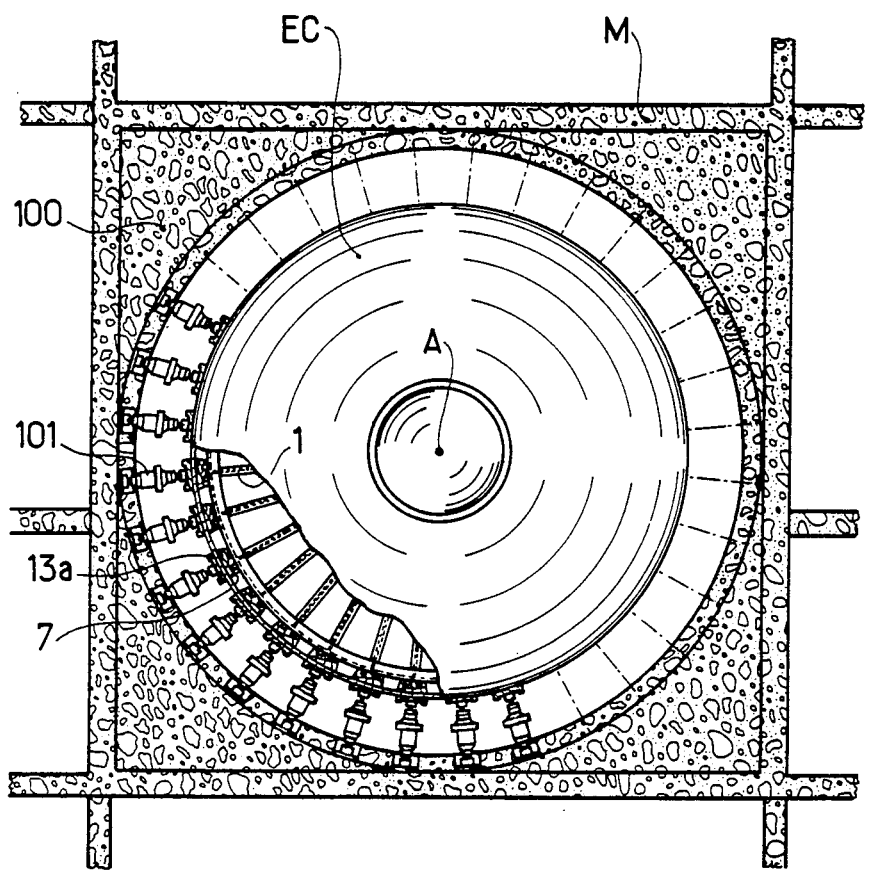
FIG. 8 is a plan view of the second hall.
Figure 9:
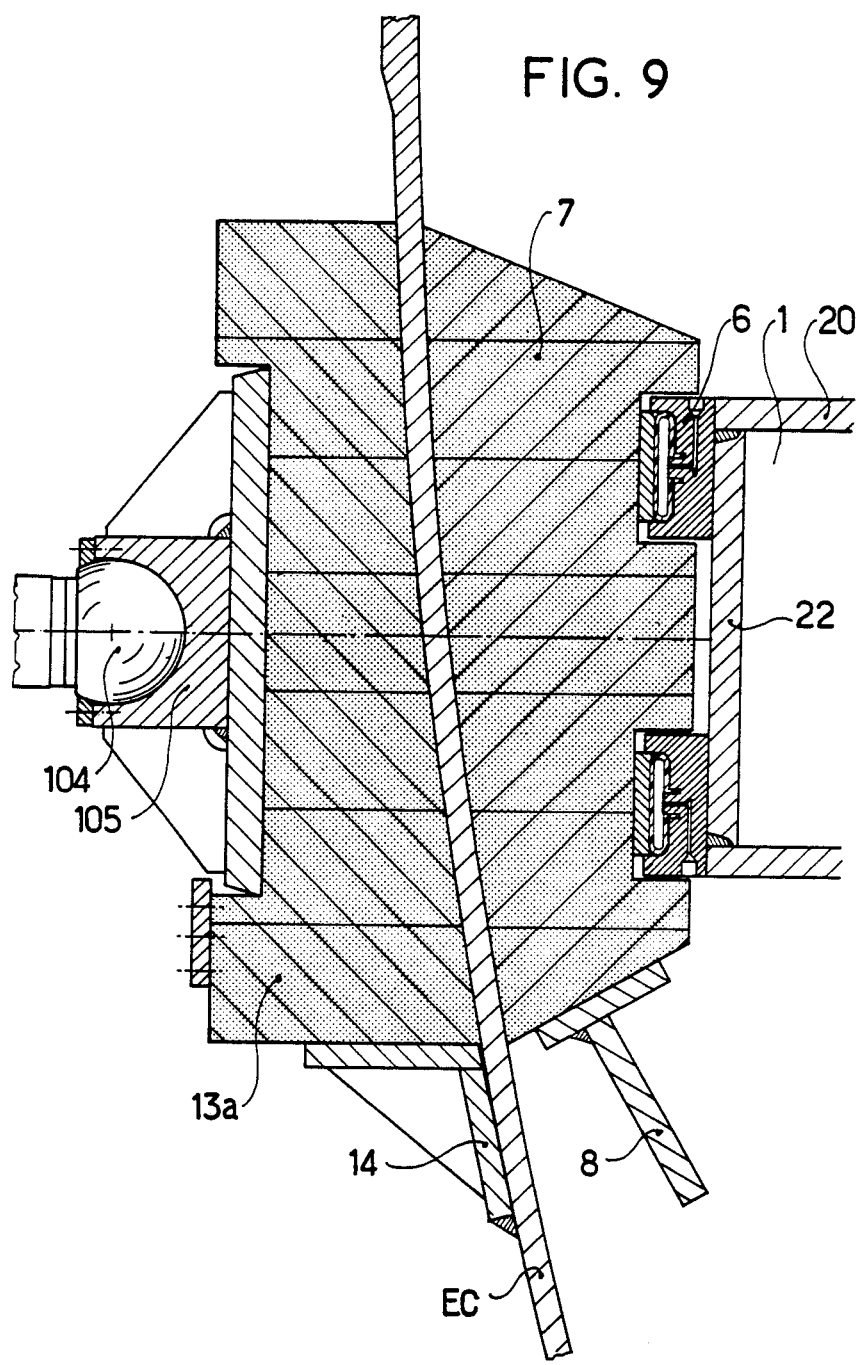
FIG. 9 is a vertical section through two thrust blocks used on either side of the confinement chamber.

The most important differences lie in the external hydraulic jacks and in the connection between the base of the boiler and the raft R. More precisely, and with reference to FIG. 8, radially extending hydraulic dampers 101 are installed in an annular gap between the floor 100 and the chamber EC. The dampers are aligned with respective stiffeners 1 and bear at one end against the floor 100 via a block 102 and at the other end against the chamber EC via a thrust block 13a. The block 13a is similar to the block 7 and is applied against the portion of the outside surface of the chamber wall which is exactly opposite to the portion against which the wooden block 7 is applied. The block 13a is supported by a metal bracket 14 (see FIG. 9).

FIG. 10 shows a compact radially extending hydraulic damper 101 comprising the following components:

A jack 103 having a rod 103a which ends in a ball 104 located at the radially inner end of the damper. The ball forms part of a ball-and-socket joint hinged on a bearing block 13a by means of a socket 105. The cylindrical wall of the jack is referenced 103e. The jack has a piston 103b which can move back and forth between two end disks 103c and 103d. The end disk 103d has an orifice 103f through which atmospheric pressure is applied to one of the faces of the piston 103b.

A thermal dissipation chamber 106 has one wall which is constituted by one of the end disks 103c of the jack 103. The dissipation chamber includes a deformable membrane 107 which delimits an enclosed volume of nitrogen 108 which acts as a pressure accumulator. The wall of the chamber is fixed to the wall of the jack 103. It is terminated by a ball 109 forming part of a second ball-and-socket joint bearing against the floor 100 via a socket 102. The balls 104 and 109 ensure that bending forces are not applied to the jacks and to the chamber EC in the event of an earthquake.

A calibrated head loss orifice 110 passes through the end disk 103c to put the jack 103 in communication with the chamber 106. The orifice may be 10 cm$^2$ in cross section for example.

A non-return valve 111 having a moving ball enables fluid to flow easily through calibrated orifices 111a in the direction from the dissipation chamber 106 into the jack 103. The total cross section of the calibrated orifices 111a is at least twice the cross section of the head loss orifice, and may advantageously be seven times the area, for example.

Ducts 101a, 101b, and 101c serve to insert various fluids and to monitor their pressures.

It can be seen that oscillations of the boiler are damped by setting up a suitable loss of head across an orifice. The energy absorbed in the damping process leads to additional problems over the first hall described herein. The absorbed energy is transformed into heat, and it is necessary for each damper to have sufficient volume to ensure that the temperature reached after the expected period of operation does not exceed a tolerable level, say 120° C. Further, the temperature should be distributed as evenly as possible throughout the fluid, e.g. water, in order to avoid hot spots which could lead to the production of steam which would hinder operation of the damper. It is thus essential for the liquid to be able to spread out evenly in all directions as it leaves the head loss orifice, thereby producing a homogenous mixture of fluid together with adequate loss of speed.

The wooden blocks 7 and 13a are held in permanent contact with the wall of the confinement chamber EC by maintaining a small pressure in the jacks.

Variations in internal pressure inside the chamber, and differential thermal expansion and contraction of the stiffeners, the wall of the chamber EC and the floor 100 all contribute to relative movement between said components. Since this movement is slow, the speed of fluid flow through the orifices and the diaphragm constrictions give rise to too small a loss of head to hinder such slow movement.

However, when rapid acting horizontal forces are applied, the fluid which is compressed in the hydraulic dampers is suddenly thrust towards the dissipation chambers. Each ball 112 is thus thrust against its seat in each such damper, leaving only the orifice 110 for the passage of fluid from the jack into the chamber 106. The resulting head loss limits the relative movement between the concrete structure and the confinement chamber. The resulting movement takes place horizontally without rocking since the base BA is left free to slide horizontally on the raft R in a manner explained below. At the same time, the fluid in the internal jacks, where compressed, is likewise suddenly thrust towards the accumulators 9. The balls 11 are therefore thrust against their seats causing the fluid flow to be diverted via the constrictions in the diaphragms 10. The resulting head loss is sufficient to have the effect of locking the jacks in question, thereby enabling forces to be transmitted to the floor 20 without substantial deformation of the wall of the confinement chamber EC.

At this point, the concrete structures may have moved relative to the chamber by several centimeters, for example.

Each internal jack may have a working surface area of 275 cm$^2$ and be fed with working fluid, e.g. water, at a pressure of several bars. The constrictions may be arranged to limit the speed at which each jack is compressed to about 5 mm per minute, which speed is substantially independent of the internal pressure of the working fluid.

By way of example, each external damper may have a working surface area of 1300 cm$^2$ with a total throw of 120 mm, and may be fed with a working fluid, e.g. water, at a pressure of a few bars. The orifices 110 may create a maximum head loss of 170 bars, for example. The volume of water in the dissipation chamber 106 of a damper may be 140 liters, with a volume of nitrogen varying between 34 and 50 liters.

Figure 11:
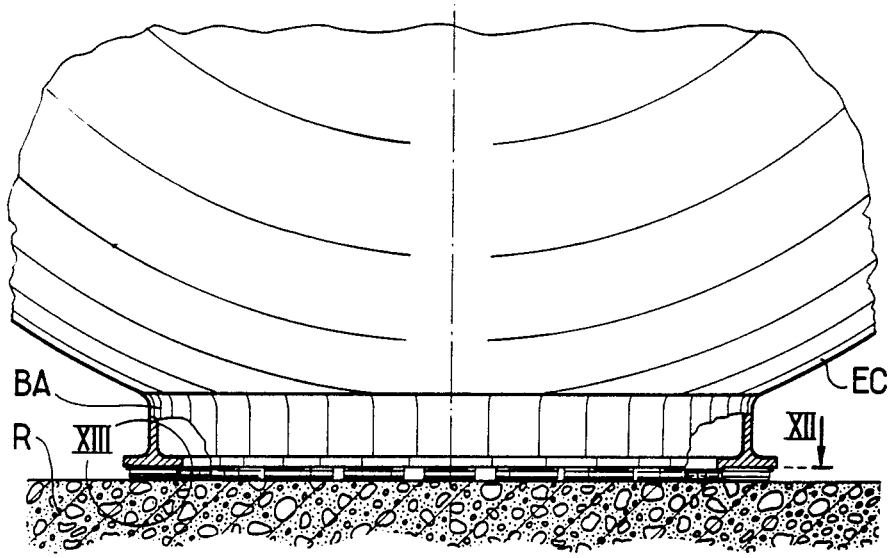
FIGS. 11 and 12 are views of a base for the confinement chamber of the secnd hall.
Figure 12:
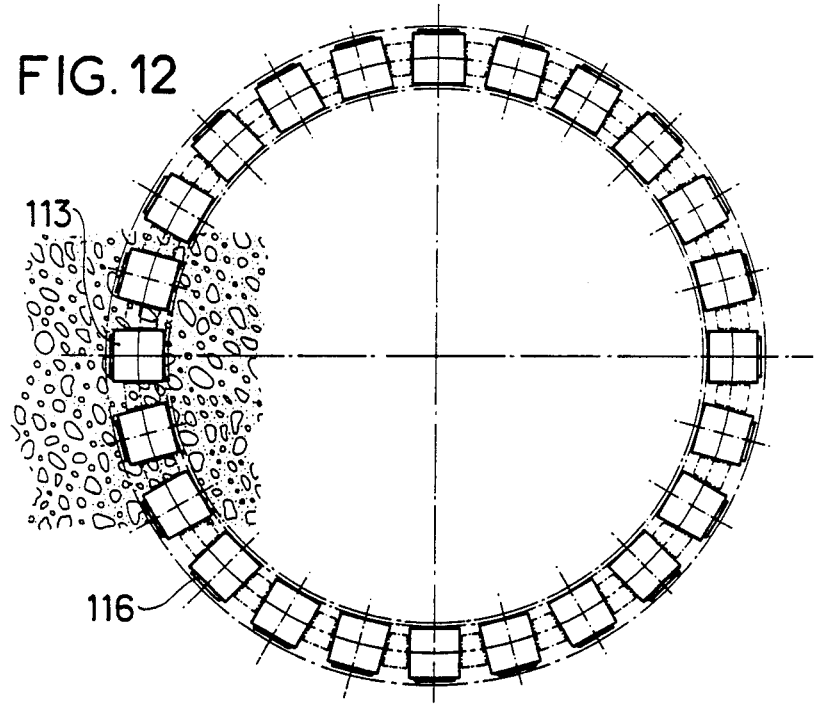
Figure 13:
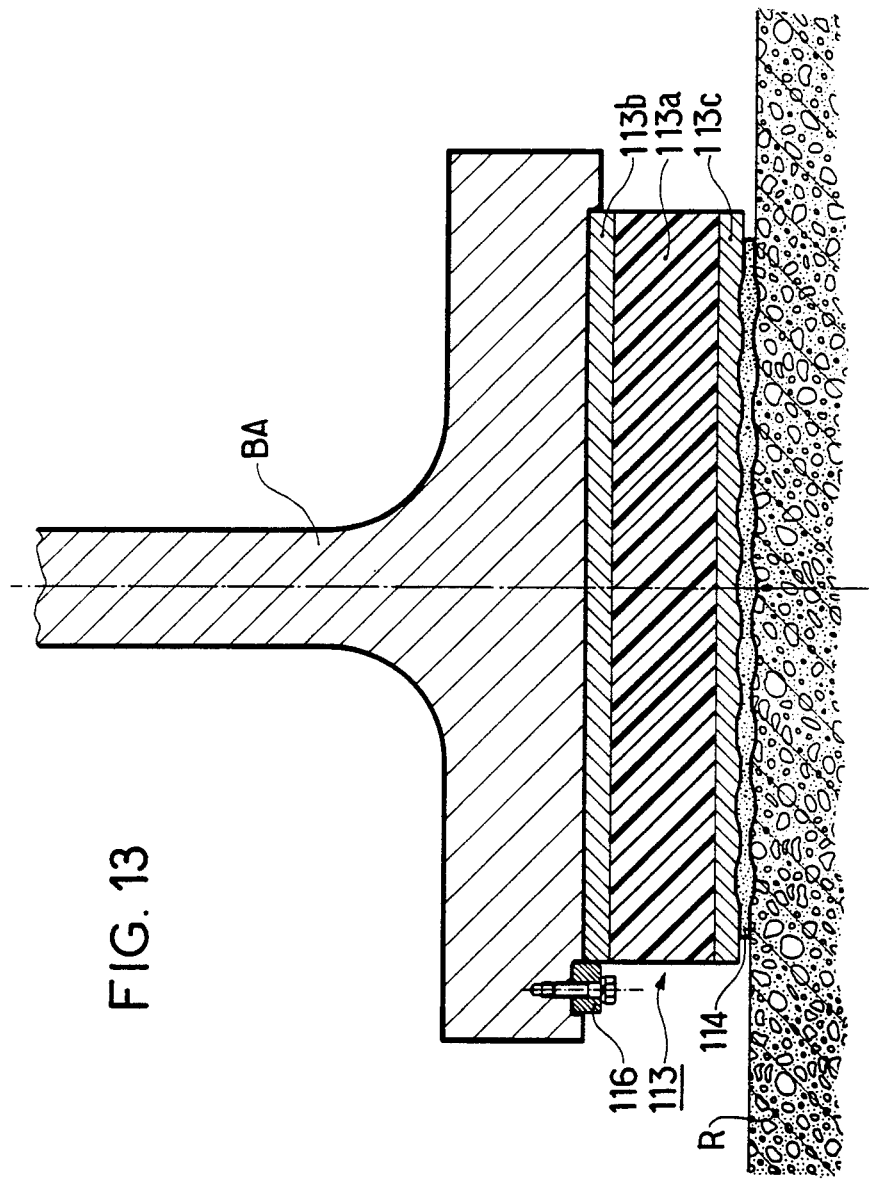
FIG. 13 is a vertical section in an axial plane on a line XIII—XIII of FIG. 11, showing a detail of the base on an enlarged scale.

As can be seen in FIGS. 11, 12 and 13, the base BA stands on the concrete raft R via skates 113. The skates are made of elastomer material and they are regularly distributed under the base.

The skates are housed under the base in such a manner that they cannot move relative to one another.

Further, the roughness of the bottom surface of the skates and the surface of the raft on which they bear is such as to prevent any slip between the skates and the raft.

Thus, after sismic shocks have ceased, the boiler and the confinement chamber are automatically recentred in the hall by elastic deformation of the skates (90% of the return force) and by the nitrogen pressure in the dampers (10%).

More precisely, (see FIG. 13), each skate 113 is in the form of a square sandwich with a side of 650 mm and 140 mm thick. The sandwich is a stack of layers of neoprene and metal, with the outer layers 113b and 113c being sheets of metal. This arrangement ensures that the skates are stiff vertically. The neoprene sheets are between 10 and 20 mm thick and the metal sheets are between 5 and 15 mm thick. The bottom plate 113c rests on a metal frame 114 into which concrete is injected so that the skate fits the shape of the raft perfectly.

The top plate is slid in radially from the outside, together with the rest of the skate, into a housing provided in the bottom face of the base BA. Each skate is locked in its housing by a stop 116 which is bolted into the radially outer edge of the bottom face of the base BA and which press against the outside edge of the skate.

We claim:

1. A nuclear hall including a boiler and a confinement chamber capable of withstanding earthquakes, said hall comprising:

a concrete structure comprising a substantially horizontal ground-supported concrete raft, and side walls standing substantially vertically on said raft;

a metal confinement chamber having a vertical axis and a base, said chamber being placed in between said side walls and resting on said raft via said base having a surface area that is at least 25% less than the maximum horizontal section of said chamber;

a nuclear boiler comprising a steam production block and auxiliary equipment, said boiler being housed inside said confinement chamber, resting on said base, and having a center of gravity which is at a greater distance above the raft than the diameter of the base;

and means for limiting oscillations of the chamber and the boiler relative to the concrete structure, while still permitting relative thermal expansions and contractions therebetween;

the improvement wherein the means for limiting oscillations comprise:

an annular metal floor inside the confinement chamber surrounding the steam production block and being fixed thereto at a predetermined height above the base, internal radially-extending stiffeners evenly distributed around the axis of the confinement chamber for reinforcing said floor;

at least one internal hydraulic jack acting radially between the outer end of each of said internal stiffeners and the inside surface of the confinement chamber and having a movable part, and an internal thrust block located between said jack movable part and the wall of the chamber and positioned in surface contact therewith;

at least one external hydraulic jack acting radially in opposition to each of said internal jack-equipped stiffeners and being located between said side walls of the hall and said outside surface of the confinement chamber and having a movable jack part, and an external thrust block located between said external jack movable part and the wall of the chamber, with each external thrust block being disposed opposite to a corresponding one of the internal thrust blocks and in surface contact with said chamber wall;

pressure accumulators operatively connected to said jacks, respectively, for applying a permanent fluid pressure to each of said jacks, tending to cause them to press said thrust blocks against the wall of said chamber and in opposition to each other;

said thrust blocks being smooth so as to impart no damage to said wall surfaces in contact with the confinement chamber wall during relative movement therebetween; and non-return valve means disposed between each jack and an accumulator connected thereto to limit the flow of working fluid in the direction from the jack to the accumulator, thereby limiting the speed at which each jack movable part can move away from the wall of the chamber when a compression force is applied thereto during some phase of an earthquake, while allowing the jack movable part to return freely, during opposing phases of an earthquake fast enough to cause said thrust blocks to remain permanently pressed against the chamber wall, regardless of the motion of the chamber and the boiler, or the deformation of the floor;

the non-return valve means of each internal jack limiting the compression movement of the jack movable part to a slow speed which is slow eough to avoid substantial energy dissipation in said internal jacks or any large displacement of the boiler relative to the chamber during an earthquake, said slow speed being nevertheless greater than the speed of relative motion caused by differential expansions and contractions of the chamber and the boiler, whereby such non-earthquake relative displacements take place substantially unhindered by the jacks.

2. A hall according to claim 1, wherein said non-return valve means of each external jack comprises means for applying a degree of resistance suitable for transforming a significant portion of the mechanical energy applied to the external jack during an earthquake into heat, thereby damping the oscillations of the boiler to limit the compression movement speed of each external jack to an intermediate speed lying between said slow and said fast speeds;

each external jack comprises heat dissipating means suitable for absorbing said heat generated in the jack during an earthquake without exceeding a predetermined maximum temperature;

the base of the boiler and the chamber stand on the raft via skates for enabling the base to move horizontally relative to the raft in a reversible manner; and wherein resilient return means act on said base to return the boiler and the chamber to their initial position after an earthquake and without exerting large forces on the chamber.

3. A hall according to claim 2, wherein said "slow" speed is less than $2 \times 10^{-4}$ m/s, and wherein said "intermediate" speed lies between 100 times the slow speed and 1.5 m/s.

4. A hall according to claim 3, wherein each external jack is connected with a pressure accumulator and with heat dissipation means thereby constituting an integrated damper disposed radially between two end members, said damper comprising:

a jack having a piston slidably mounted in a cylinder to move towards and away from an end disk thereby varying a working volume which is filled with a working liquid, said piston being connected to one end of the damper and said cylinder and said end disk being connected to the other end of the damper;

a heat dissipation chamber communicating via a calibrated head loss orifice with said working volume, and itself containing a greater volume of working liquid than the jack, whereby the heat resulting from dissipation of the mechanical energy in the form of jets of liquid passing through said calibrated orifice can be absorbed in the working liquid without exceeding said predetermined maximum temperature;

said pressure accumulator being a gas pressure accumulator which is from the working liquid in the dissipation chamber by a flexible membrane which is capable of standing up to said predetermined maximum temperature, and capable of changing in gas volume by an amount at least equal to the possible variation in the working volume of the jack; and non-return valve means enabling the working liquid to pass freely from the dissipation chamber into the jack, while causing the liquid to return to the dissipation chamber via said calibrated orifice, thereby braking any motion of the boiler and its confinement chamber having a tendency to shorten the jack, while allowing the jack to lengthen freely.

5. A hall according to claim 4, wherein each external damper is provided with joint means at each end to avoid applying bending forces to the confinement chamber.

6. A hall according to claim 2, wherein the skates supporting the base of the confinement chamber and the boiler are made of resilient material built-in both to the base and to the raft, thereby constituting said resilient return means.

7. A hall according to claim 1, wherein the number of pressure accumulators is smaller than the number of internal jacks, each accumulator feeds a plurality of internal jacks with working fluid under pressure, and said jacks common to any one accumulator are regularly distributed around the chamber to avoid concentrating the effect of a breakdown should the pipework leading to any one of the accumulators burst.

8. A hall according to claim 1, wherein each internal thrust block, at least on its face which is in direct contact with the inside surface of the confinement chamber, is not as hard as the metal of the confinement chamber, thereby avoiding both the risk of marking the wall thereof when transmitting large forces, and avoiding the risk of grazing the wall in the event of the block slipping.

9. A hall according to claim 1, wherein the concrete structure includes not only said nuclear hall, but also other halls which are arranged to have floors or ceilings constituted by respective horizontal slabs connected to the outside faces of said side walls of the nuclear hall substantially on a level with said external jacks, thereby providing increased horizontal support to enable said side walls to withstand the horizontal forces applied thereto by said jacks, said concrete structure further including a roof member to protect the confinement chamber against impacts of external origin.

10. A hall according to claim 1, wherein the external jacks bear against the side walls via a floor arranged around the confinement chamber substantially on a level with the jacks and fixed to said walls.

* * * * *